United States Patent [19]
Cushing

[11] Patent Number: 5,719,989
[45] Date of Patent: Feb. 17, 1998

[54] MULTILAYER THIN FILM BANDPASS FILTER

[75] Inventor: David Henry Cushing, Greely, Canada

[73] Assignee: JDS Fitel Inc., Nepean, Canada

[21] Appl. No.: 529,449

[22] Filed: Sep. 18, 1995

Related U.S. Application Data

[63] Continuation-in-part of Ser. No. 496,097, Jun. 28, 1995.
[51] Int. Cl.$^6$ ............................. G02B 5/28; G02B 5/10; G02B 5/22
[52] U.S. Cl. .................... 359/589; 359/587; 359/588; 359/885
[58] Field of Search ........................ 359/580, 584, 359/585, 586, 588, 589, 587, 885; 333/212

[56] References Cited

U.S. PATENT DOCUMENTS

| | | | |
|---|---|---|---|
| 5,144,498 | 9/1992 | Vincent | 359/885 |
| 5,212,584 | 5/1993 | Chung | 359/588 |
| 5,410,431 | 4/1995 | Southwell | 359/580 |
| 5,583,683 | 12/1996 | Scobey | 359/587 |

OTHER PUBLICATIONS

"Thin Film Optical Filters" H. A. Macleod, McGraw Hill, 1989, No Month.

*Primary Examiner*—Paul M. Dzierzynski
*Assistant Examiner*—Audrey Chang
*Attorney, Agent, or Firm*—Neil Teitelbaum & Associates

[57] ABSTRACT

A novel design for producing bandpass filters with essentially square shapes with little or no ripple in the passband zone. Filters are of the all-dielectric type that consist of multiple cavities of bandpasses with the first and last cavities consisting of four less layers than the inner cavities. The inner cavities all have the same number of layers. All of the cavities are separated from each other by quarter wave thick layers of low index material. Layers of low index material may be added between the filter and the entrance and exit mediums. Multiple half-waves are added to the outer cavity quarter-wave stacks in particular and also may be added to some of the inner cavity stacks, These sharpen the transition from low transmission to high transmission without unduly adding ripple to the high transmission zone. The thickness of the first few layers and last few layers may be altered to enhance the transmission of the filter by matching the index structure of the passband to the adjacent mediums.

4 Claims, 12 Drawing Sheets

| SUBSTRATE |
|---|
| M layer     CAVITY #1 |
| QW LOW INDEX |
| M layer   CAVITY #2 |
| QW LOW INDEX |
| M layer   CAVITY #3 |
| QW LOW INDEX |
| M layer   CAVITY #4 |
| QW LOW INDEX |
| M layer     CAVITY #5 |
| EMERGENT MEDIUM |

| QWS #1 |
|---|
| HALF WAVE |
| QWS #2+L+QWS #3 |
| HALF WAVE |
| QWS #4+L+QWS #5 |
| HALF WAVE |
| QWS #6 |

Fig. 5a.  Prior Art

| |
|---|
| Altered QWS #1  N/2 layers |
| HALF WAVE |
| Altered QWS #2 N/2 layers<br>+L<br>+QWS #3 (N/2+2) layers |
| HALF WAVE |
| QWS #4 (N/2+2) layers<br>+L<br>+ Altered QWS #5 N/2 layers |
| HALF WAVE |
| QWS #6 (N/2) layers<br>+L<br>+QWS #7 (N/2) layers |
| HALF WAVE |
| QWS #m (N/2) layers<br>+L<br>+ Altered QWS #(m+1) (N/2) layers |
| HALF WAVE |
| Altered QWS #(m+2) (N/2) layers + ... |

MULTILAYER THIN FILM BANDPASS FILTER

This application is a Continuation-in-Part of application Ser. No. 08/496,097 filed Jun. 28, 1995.

FIELD OF THE INVENTION

This invention relates to dielectric bandpass filters, and more particularly to multi-layer multi-cavity structures that reduce transmission ripple in the passband.

BACKGROUND OF THE INVENTION

Optical interference, that modifies the transmitted and reflected intensities of light, occurs with the superposition of two or more beams of light. The principle of superposition states that the resultant amplitude is the sum of the amplitudes of the individual beams. The brilliant colors, for example, which may be seen when light is reflected from a soap bubble or from a thin layer of oil floating on water are produced by interference effects between two trains of light waves. The light waves are reflected at opposite surfaces of the thin film of soap solution or oil.

More importantly, a practical application for interference effects in thin films involves the production of coated optical surfaces. When a film of a transparent substance is deposited on transparent substrate such as glass, for example, with a refractive index which is properly specified relative to the refractive index of the glass and with a thickness which is one quarter of a particular wavelength of light in the film, the reflection of that wavelength of light from the glass surface can be almost completely suppressed. The light which would otherwise be reflected is not absorbed by a non-reflecting film; rather, the energy in the incident light is redistributed so that a decrease in reflection is accompanied by a concomitant increase in the intensity of the light which is transmitted.

Considerable improvements have been achieved in the anti-reflective performance of such films by using a composite film having two or more superimposed layers. Two different materials may be used in fabricating such a composite film, one with a relatively high index of refraction and the other with a relatively low index of refraction. The two materials are alternately deposited to predetermined thickness' to obtain desired optical characteristics for the film. In theory, it is possible with this approach to design multi-layer interference coatings for a great variety of transmission and reflection spectrums. This has led to the development of many new optical devices making use of complex spectral filter structures. Anti-reflection coatings, laser dielectric mirrors, television camera edge filters, optical bandpass filters, and band rejection filters are some of the examples of useful devices employing thin film interference coatings.

One particular type of interference coating is the bandpass filter, which is designed to allow wavelengths within a predetermined range of the desired pass-band to be transmitted, while a range of wavelengths on either side of the pass band are highly reflected. Ideally a bandpass filters should be square in its response; thus, the transition from the rejection regions to the passband should be as rapid as possible, or expressed differently, the slope or transition region should be as steep as possible, while obtaining a pass band region that is uniform having little or no ripple.

Multi-cavity filters have been manufactured for more than 40 years. A usual approach of filter designers has been to simply anti-reflect equal length cavity structures to the substrate and the exit medium. However, this yields filters with excessive ripple in the passband. In an attempt to obviate this problem, the need to modify the cavity lengths was investigated thoroughly by experts in the thin film field. P. W. Baumeister in a paper entitled "Use of microwave prototype filters to design multilayer dielectric bandpass filters", published in Applied Optics Vol. 21, No. 16, Aug. 15, 1982, describes the use era standing wave ratio technique to match reflective zones applying microwave filter synthesis. C. Jacobs in an article entitled "Dielectric square bandpass design", in Applied Optics, Vol. 20, No. 6 Mar. 15, 1981, describes the use of an effective index approach. A. Thelen in a book entitled Design of Optical Interference Coatings, McGraw-Hill Book Company 1989, describes equivalent layers and other schemes to reduce ripple. However, the layer sequences developed from these methods are not considered to be general and do not apply equally well for different ratios of index of refraction of the multi-layers.

Generally, procedures that result in high transmission reduce the bandwidth of this transmission at the expense of poor slopes (i.e. a slow rate of change) in the transition to blocking. Since the improvement in transmission outweighs the change in slope, additional cavities may be added to a filter to improve the slope.

In view of the limitations of the prior art, it is an object of this invention to provide a bandpass filter that overcomes many of these limitations.

Furthermore, it is an object of this invention to provide a bandpass filter in the form of a multi-layer, multi-cavity structure that reduces transmission ripple in the passband normally associated with other bandpass filters.

Furthermore, it is an object of this invention to provide a bandpass filter in the form of a multi-layer, multi-cavity structure that reduces transmission ripple in the passband and provides better slopes than those normally associated with other bandpass filter designs with reduced ripple.

SUMMARY OF THE INVENTION

The present invention is comprised of a multilayer film of alternating layers of two (or more) transparent dielectric films with dissimilar indices of refraction. The invention utilizes anti-reflection from the filter structure to the substrate and output interfaces (if necessary) and also utilizes outer cavities with four layers less than the inner core structure on both sides of the core structure, to produce a low reflection profile in the passband. The squarest filters would have extra half waves added to various layers in selected cavities. The bandpasses for any of these designs will reduce the bandwidth of transmission compared to equal length cavity structures. The filter as described has a much better slope in the high transmission zone than those cited above in the background information (for filters with reduced ripple). The above noted structure is a very general approach to the design of high transmission filters with very steep slopes.

Advantageously, the filter as described in accordance with the invention has a much better slope than those of the aforementioned prior art. The desired results are produced with virtually any suitable materials that are transparent in the spectral area of interest.

In accordance with the invention, there is provided a bandpass filter comprising: an array of cavities including two outer cavities and one or more other inner core cavities, each cavity having a plurality of quarter-wave reflecting stacks comprising layers of material of alternating high and low refractive index, said plurality of stacks beings separated by a half wave layer of dielectric material, each cavity being separated by quarter-wave layer of low refractive index material, wherein the number of layers in the at least one or more other cavities is an odd number greater or equal to 7, and wherein the first and last cavities in said array of cavities each have two less layers in each quarter-wave reflecting stack than in other quarter-wave reflecting stacks of the at least one or more other cavities in said array. Additionally half-wave layers are added to selected quarter-wave layers in the outer cavities to alter the slope of the passband. Also half-wave layers are positioned in the inner cavities and are added to quarter-wave layers to remove ripple induced by the altered outer cavities.

In accordance with the invention, there is further provided a bandpass filter comprising: an array of cavities including two outer cavities and at least one or more other cavities, each cavity having a plurality of quarter-wave reflecting stacks comprising layers of material of alternating high and low refractive index, the at least one or more other stacks being separated by a half-wave layer of dielectric material, the plurality of stacks of said outer cavities being separated by a multiple half-wave layer of dielectric material for broadening the bandwidth of a passband of the filter and for reducing residual reflections, each cavity being separated by quarter-wave layer of low refractive index material, wherein the number of layers in the at least one or more other cavities is an odd number greater or equal to 7, and wherein the first and last cavities in said array of cavities each have two less layers in each quarter-wave reflecting stack than in other quarter-wave reflecting stacks of the at least one or more other cavities in said array. Additionally half-wave layers are added to selected quarter-wave layers in the outer cavities to alter the slope of the passband. Also half-wave layers are positioned in the inner cavities and are added to selected quarter-wave layers to remove ripple induced by the altered outer cavities.

In accordance with the invention there is further provided, a bandpass filter comprising: an array of cavities including two outer cavities and at least one or more other cavities, each cavity having a plurality of quarter-wave reflecting stacks comprising layers of material of alternating high and low refractive index, the at least one or more other stacks being separated by a multiple half-wave layer of dielectric material, and the plurality of stacks of said outer cavities being separated by a multiple half-wave layer of dielectric material for broadening the bandwidth of a passband of the filter and for reducing residual reflections, each cavity being separated by quarter-wave layer of low refractive index material, wherein the number of layers in the at least one or more other cavities is an odd number greater or equal to 7, and wherein the first and last cavities in said array of cavities each have two less layers in each quarter-wave reflecting stack than in other quarter-wave reflecting stacks of the at least one or more other cavities in said array. The multiple half-waves of the outer cavities may have the same number of half-waves as the inner cavities or may have more half waves. Additionally half-wave layers are added to selected quarter-wave layers in the outer cavities to alter the slope of the passband. Also half-wave layers are positioned in the inner cavities and are added to selected quarter-wave layers to remove ripple induced by the altered outer cavities.

BRIEF DESCRIPTION OF THE DRAWINGS

Exemplary embodiments of the invention will now be described in conjunction with the drawings, in which.

FIG.

FIG.

FIG.

GENERAL INFORMATION ABOUT FILTER CONSTRUCTION

Filters for wavelength division multiplexers and other communication industry applications require very straight slopes with low loss and virtually no ripple. Typical bandwidths range from 0.5 nm to 100 nm for the wavelength range 1250 to 1650 nm. There are many other applications for filters that would benefit from this improvement in technology that is provided by this invention.

Figure 2:
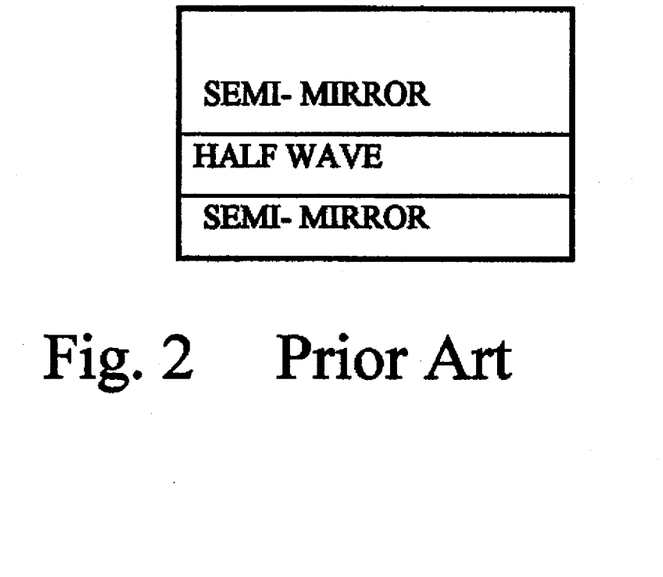
FIG. 2 is a cross sectional view of a solid etalon filter in accordance with the prior art.

The simplest filter, shown in prior art FIG. 2, consists of two partial-reflectors or semi-mirrors separated by a half wave layer of transparent dielectric material (similar to an Etalon).

Figure 3:
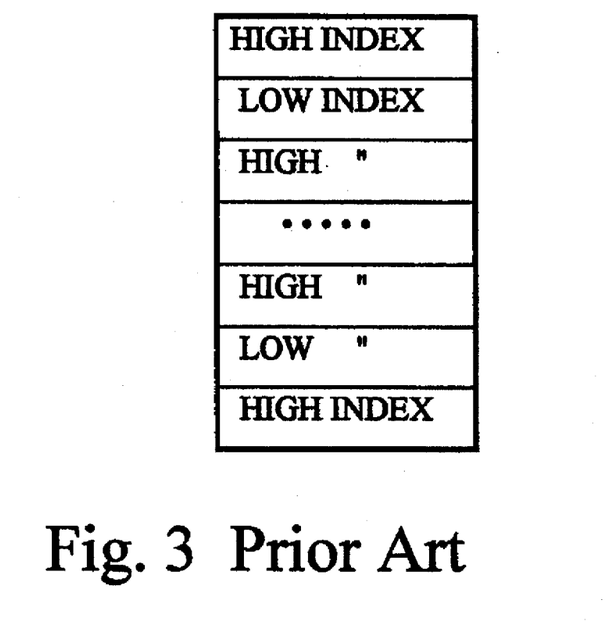
FIG. 3 is a cross sectional view of a prior art quarter wave stack (QWS)

Turning now to FIG. 3, for all-dielectric filters, the partial-reflector shown consists of alternating layers of high and low index materials. The thickness of each layer is adjusted to be a quarter wave (QW) at the wavelength of the desired filter. Each partial-reflector (which may be comprised of only a single layer) is called a quarter-wave stack. The bandwidth of the filter is a function of the reflectance of quarter-wave stacks in the structure.

Figure 4:
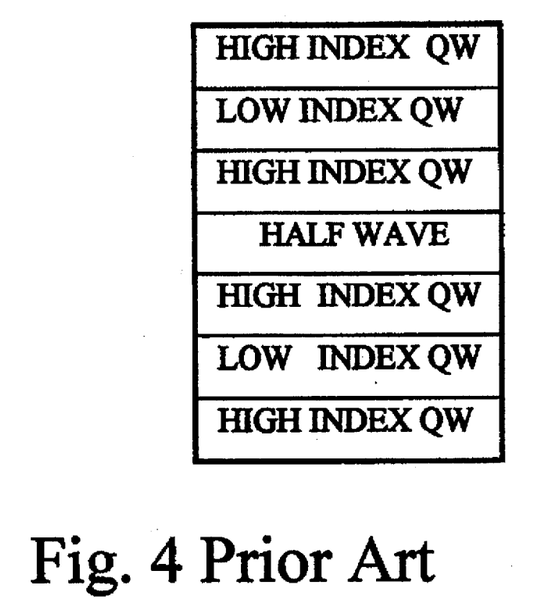
FIG. 4a is a cross sectional view of a prior art dielectric filter cavity.
FIG. 4b is a cross sectional view of a dielectric filter cavity in accordance with this invention.
Figure 4B:
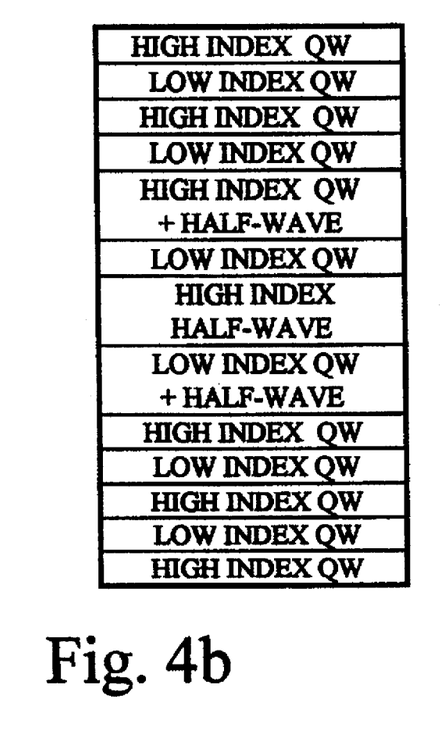
Figure 5A:
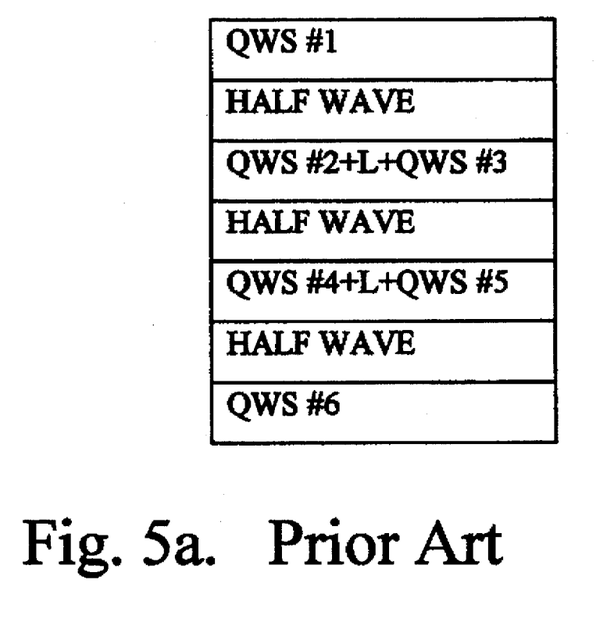
FIG. 5a is a cross sectional view of a prior art multi-cavity filter.
Figure 5B:
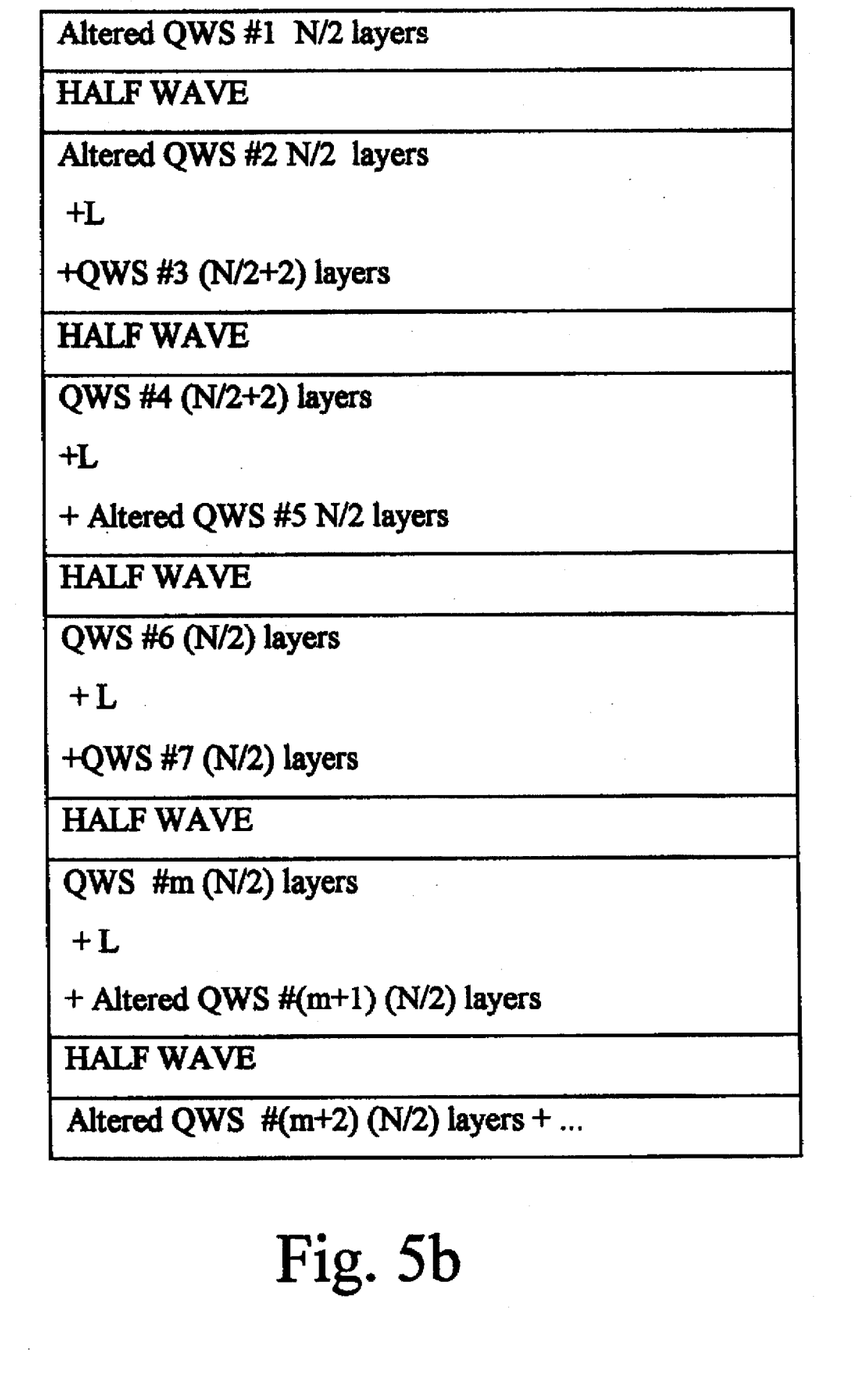
FIG. 5b is a cross sectional view of a multi-cavity filter in accordance with the invention.

Referring now to FIG. 4a, a filter cavity, one of the most ubiquitous and basic building blocks for all-dielectric interference filters, is shown. The cavity is comprised of two identical reflectors made from quarter-wave stacks separated by a half wave (or multiple half-wave) layer, as is seen in FIG. 4a. Cavities are deposited on top of other cavities, with a quarter-wave layer of low index material between, to sharpen the slopes. This produces a multi-cavity filter shown in FIG. 5a.

Figure 6:
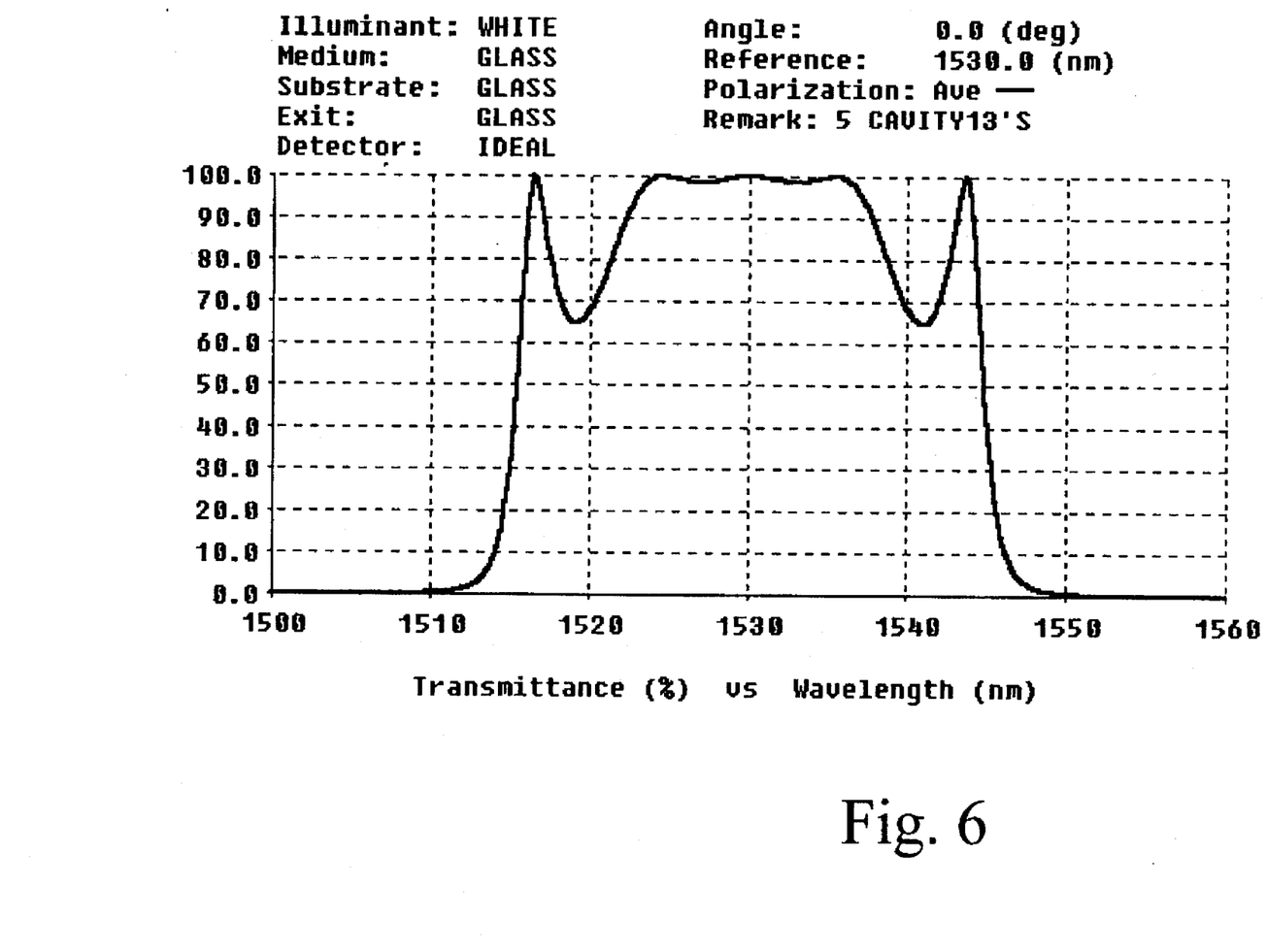
FIG. 6 is a graph of transmittance versus wavelength of a conventional five cavity filter each cavity with thirteen layers separated by low index quarter wave layers.

From a practical point of view, the total number of layers to be deposited controls the number of cavities possible. At 0.3 nm bandwidth and greater, multi-cavity designs are possible. Filters up to 10 nm bandwidth may be made easily with 3 or 4 cavities. For greater than 6 nm, even more cavities may be necessary to achieve the slopes for blocking the transmission of unwanted wavelengths of light. These filters have a large number of layers. Surface area yield is small and 25 mm diameter may be typical for the narrower bands. Equal length cavities produce the best roll-off with the broadest pass-zones, but examination of the graphs for equal cavity filters demonstrates that improvement is needed to reduce ripple in the passband to acceptable levels shown in FIG. 6.

DETAILED DESCRIPTION OF THE INVENTION

Figure 1A:
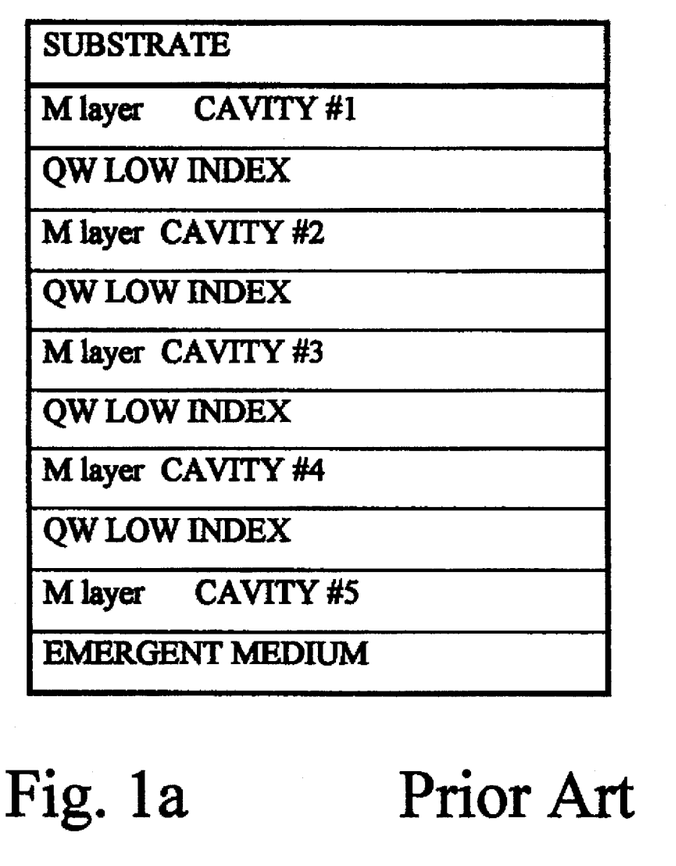
FIG. 1a is a cross sectional view of a prior art bandpass filter ensemble.
Figure 1B:
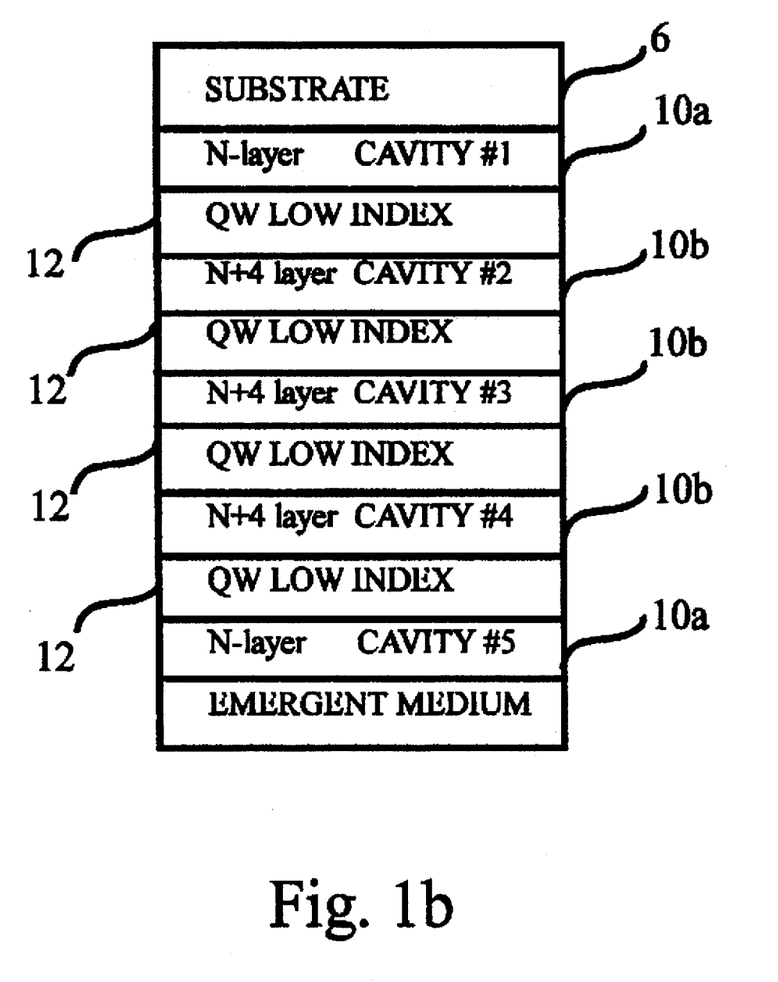
FIG. 1b is a cross sectional view of a bandpass filter ensemble in accordance with the invention.

As shown in FIG. 1b, the filter ensemble of the invention includes: a transparent substrate 6, an optional matching layer above the substrate, if necessary (, not shown); an outer filter cavity 10a having N layers, where N≧3 and the thickness of some of the layers may be three quarter-wave; a low refractive index layer 12; a series of filter core cavities 10b each having (N+4) layers, a layer 12 having a low refractive index between adjacent cavities 10a, 10b; another outer filter cavity 10a having N layers and the thickness of some of the layers may be three quarter-waves; and, another matching layer if necessary(, not shown). Half-wave layers are interspersed in the quarter-wave stacks to improve the slope. The number of and position of these added half-waves will vary with individual applications. In contrast, prior art FIG. 1a, shows a conventional filter having 5 cavities, each cavity having M layers including the outermost cavities.

Referring again to FIG. 1b of the invention, generally, the optional matching layer is a low refractive index material having a thickness of a quarter wave. However, material, thickness, and index of refraction of the matching layer(s) may be different from that of the low index material 12. The cavities 10a and 10b comprise alternating quarter wave thick layers of high and low index materials. The first material in a cavity 10a is high index and is followed by a low index material. For the simplest case the low index material is a multiple of half waves and is followed by a high index material i.e. HLLH; each layer indicating a quarter wave thick high or low index material. Thus, HLLH is considered to be a three layer structure, having a half wave layer LL of low refractive index material disposed between two layers H, each a quarter wave thick of high refractive index material. The improve the slope, the H layers are changed to HHH layers; the LL layers are changed to an LLLL layer. Next, the low index layer 12 is disposed between each cavity 10a and/or 10b that follows. The next core cavity 10b is of the layer structure HLH LL HLH in the simplest case. Hence, the core cavity 10b is considered to be a seven layer structure, having a half wave layer LL disposed between two HLH, quarter wave layers stacks. To reduce ripple introduced by the added half-wave layers some of the layers in the core cavities shall also have half-wave layers added to them. The core cavity 10b may be repeated many times to produce a filter having sharp slopes. The first cavity 10a is then repeated; and, finally another matching layer to the next medium is added as necessary.

The substrate 6 is transparent over the wavelength of interest and may be made from a wide variety of materials including but not limited to glass, quartz, clear plastic, silicon, and germanium. The dielectric materials for this application have indices of refraction in the range 1.3 to greater than 4.0. The preferred materials are Magnesium Fluoride (1.38), Thorium Fluoride (1.47), Cryolith (1.35), Silicon Dioxide (1.46), Aluminum Oxide (1.63), Hafnium Oxide (1.85), Tantalum Pentoxide (2.05), Niobium Oxide (2.19), Zinc Sulphide (2.27), Titanium Oxide (2.37), Silicon (3.5), Germanium (4.0), and Lead Telluride (5.0). Other dielectric materials would serve as well.

After establishing the number of layers in each cavity, in accordance with the teaching of this invention, the design of the filter is easily accomplished with the aid of a commercially available computer program with optimization routines (for example, TFCalc™ by Software Spectra Inc.). Design recipes are entered into the program and a spectral response is calculated. When the design with the proper size cavities is selected to match the required nominal bandwidth, optimization of the filter transmission is performed for the matching layers. A designer selects from a choice of materials to use in a quarter wave match or may choose to use the same low index material with thickness adjustments to accomplish the matching.

The filter of FIG. 1b includes of an array of cavities, each separated by quarter waves of low index material. The number of layers in the core cavities 10b is an odd number and has to be more than five. The improvement in lessening ripple is quite pronounced for core cavities 10b with more than seven layers. In accordance with this invention, the first and last cavities 10a will have two less layers in each quarter wave stack for a total of four less layers in each cavity. The number of half waves in these outer cavities 10a should be the same as, or more than, those in the core stack(s) 10b. Theoretical plots will determine the optimum number of half waves for each situation. Additional half-waves are attached to quarter-wave layers in the outer stacks yielding three-quarter wave layers to improve the slope. However, this introduces ripple. Nevertheless when the slope is satisfactory, the ripple may be reduced by adding more half waves to quarter-waves in the inner stacks thereby yielding three-quarter wave layers. When the general attributes of the filter are satisfactory, the position of the added multiple waves may be tested for angular sensitivity. Altering the positions slightly may provide vastly improved filter properties for a variety of angles of incidence.

Figure 7:
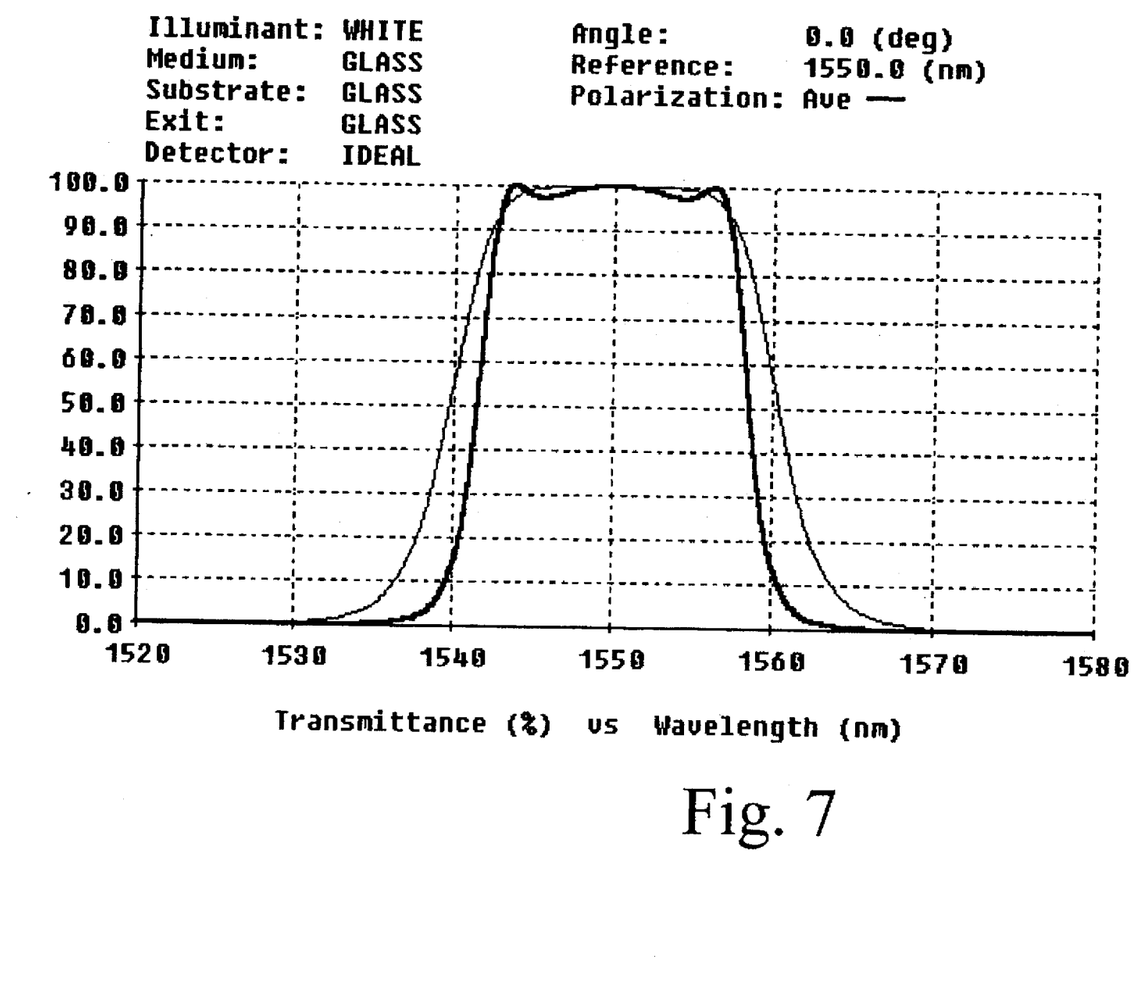
FIG. 7 is a graph of transmittance versus wavelength for a four cavity structure (heavy line) having an eleven layer cavity, two fifteen layer cavities, and a second eleven layer cavity in accordance with this invention consisting of 55 layers with 79 quarter-waves. The light line is the same cavity structure with no added half-waves.

FIG. 7 (heavy line) shows the transmission profile of a bandpass filter having two fifteen layer core stacks and eleven layer outer stacks. The 11 layer outer stacks have the form of HLH 3L 3H 4L H 3L HLH with H representing a quarter-wave optical thickness layer of high index material; 3H indicates an additional half-wave of high index material; L indicates a quarter-wave optical thickness of low index material; etc. The inner stacks consist of HLHLHLH LL HL (LL) HLHLH with the (LL) added only in one cavity. This (LL) could be in front of the half-wave in the same position to produce the same effect. The high index material has an index of refraction of 2.24 and the low index material has an index of 1.45. The light line indicates the spectral characteristics of the basic filter with layers numbering 11-15-15-11 with half waves only. The substrate and medium are glass and each have an index of 1.51. The improvement of the slope with minor ripple in the transmission zone is obvious. The bandwidth at half-power points has essentially not changed, but out of band blocking at points further removed is substantially better.

Figure 8:
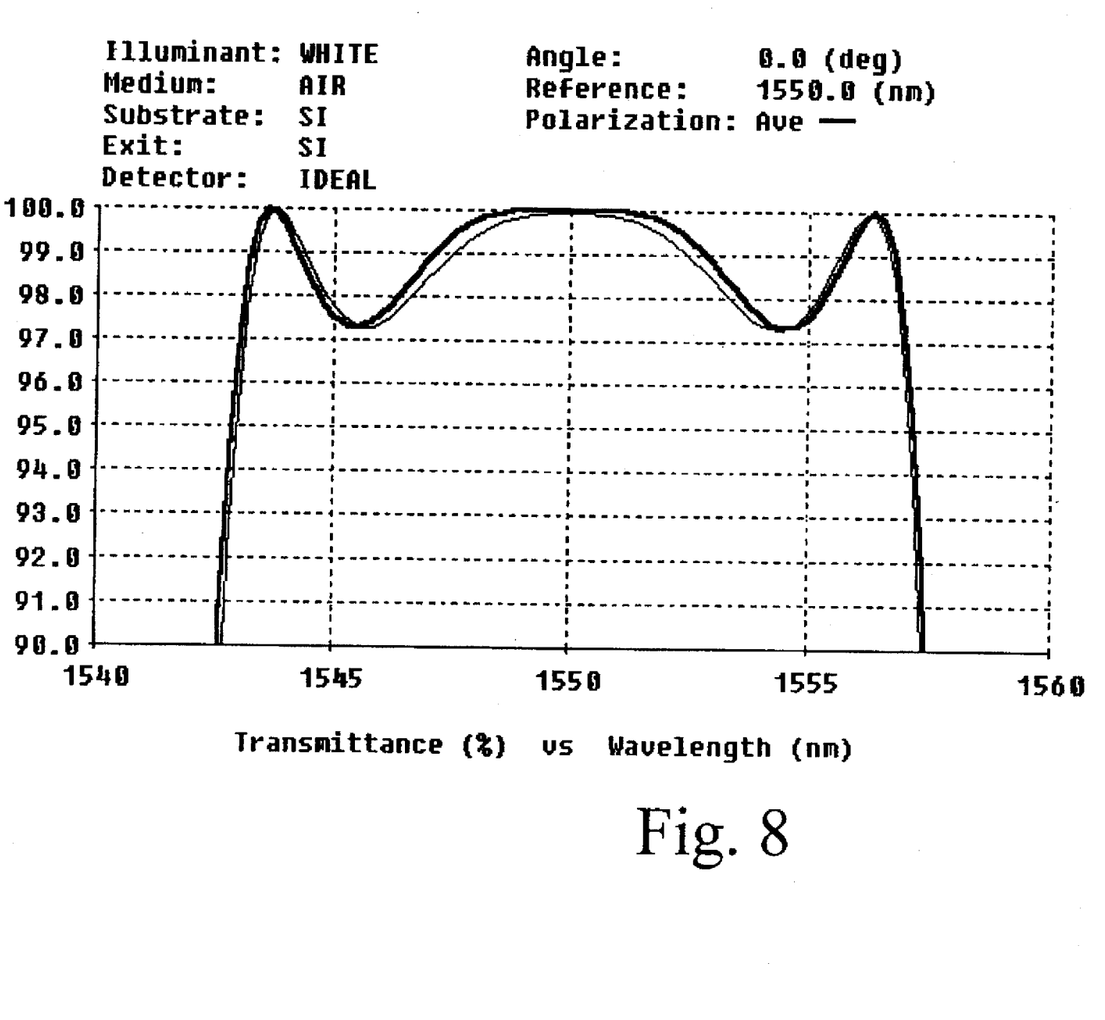
FIG. 8 is a chart (heavy line) representing a 55 layer four cavity filter with 79 quarter-waves designed in accordance with the invention. The substrate is silicon and the emerging medium is air. A light line demonstrates the filter of FIG. 7 embedded in glass for comparison.

The index of refraction of the substrate and the emergent (or exit) medium will affect the ripple. To reduce ripple to a minimum, it may be necessary to match the filter structure to the emergent medium. For example, when the refractive index n of the emergent medium is between 1.44 and 1.8 a quarter wave layer of the low index material (for a low index material with an index of approximately 1.48 or less) may provide suitable matching. For indices of refraction greater than approximately 1.8 or less than approximately 1.44, layer changes are necessary between the medium and the filter. This particular problem is well known and has been addressed by those proficient in the art. FIG. 8 demonstrates the effect of matching a filter with an exit medium. The same Four Cavity Filter from FIG. 7 is matched to a silicon substrate by removing layer 1. It is also matched to an emerging medium air with anti-reflection matching layers comprising a 0.7185 quarter wave of ZnS for layer 54 and adding layer 55 of 0.643 quarter wave of ThF4. The ripple in the passband is virtually identical to that in FIG. 7. For any substrates and exit mediums structure changes next to the mediums enhance the performance of the filter such that the indices of the substrate and output medium are not obstacles.

EXAMPLES

Using Zinc Sulphide (with an index of 2.24) and Thorium Fluoride (with an index of 1.45) for the multi-layers, various four cavity filters were calculated for different amounts and positions of added half-waves.

The filters of this invention consist of an array of equal length cavities (the same number of layers ) for all but the outer cavities. The outer cavities contain four less layers each (two less on each side of the half-wave). The shape of the bandpass for this configuration is a smooth graph with low ripple, if any. The slope of the resulting graph may be defined arbitrarily by analyzing the bandwidths at convenient percent transmittance positions. For the purpose of comparison we will define the bandwidth ratio for 0.01% T to 50%. It will be named S for slope. It is much smaller for filters with all equal length cavities than for filter structures that have been altered to improve ripple.

For filters with less layers in the outer cavities, adding half-waves to the half waves of the outer cavities considerably improves the ratio. Further improvement of the bandwidth at the 0.01% points (and all others in between) may be accomplished by adding half-wave thickness to the layers that comprise the quarter-wave stacks of the outer cavities in particular. These become three quarter-waves thick. This adds ripple to the bandpass, but the value can be controlled by varying the number and position of the added half-waves. In addition, control of the ripple is affected by added half-waves on the inner cavities. The band-factor is degraded simultaneously, therefore use of this design tool must be considered on a case by case basis.

By defining bandshape S=(bandwidth @0.01%T)/(bandwidth @50%T) and ripple R=100%-%T @minimum in the passband, comparisons may be made between filter types.

In addition to the above factors, the total number of quarter-waves and the total number of layers should be minimized. In order to gauge bandwidth improvement with additional half-waves in the quarter wave structure, basic bandwidth information must be evaluated first.

To illustrate this using Zinc Sulphide- Thorium Fluoride multi-layer filters with 15 layers for cavities:

four cavity—15 layers each: S=2.35 R=81% this contains 63 layers with 67 quarter-waves These are benchmarks. None of the following four cavity designs can have a better slope than this. Comparisons are configured as below:

four cavity type of 11-15-15-11 layers: S=3.37 R=99.8% (case 1)

with matching to the mediums, this is 57 layers with 61 quarter-waves.

To improve this factor the half waves for the first and last cavities may be changed to full waves (or more).

four cavity type as in case 1, but altering the half-waves to:

# of quarter-waves of 4-2-2-4 in the cavities: S=2.85 R=99.6% (case 2) with matching to the mediums, this is 57 layers with 63 quarter-waves.

The shape may be further improved by also adding half waves to certain layers in the quarter wave stacks.

If the objectives are not too demanding, satisfactory characteristics may be achieved with a few added layers and other desirable affects will also result. Strictly using the least amount of added layers for improved shape factor:

ZTZT 3Z 4T 3Z TZTZ for the first and last cavities R=95% and S=2.6 this contains 55 layers with 71 quarter-waves and ZTZ 3T 3Z 2T 3Z 3T ZTZ for the first and last cavities R=95% and S=2.62 this has 55 layers with 75 quarter-waves. These filter characteristics are reasonable for most applications. For fiber optics communications less ripple is desirable. Better Ripple factors require less three quarter or half wave layers and filters with very low ripple will have S values near 2.85.

For instance, ZTZ 3T 3Z 2T ZTZTZ outer cavities give results similar to the 4-2-2-4 type.

R=99.5% S=2.85.

Changing the outer cavities to: ZTZ 3T 3Z 2T 3Z TZTZ produces intermediate results of:

R=97.6% and S=2.74.

Moving the three quarter waves away from the half wave smoothes the ripple but the bandshape ratio degrades. For general applications it is desirable for filters to have very small changes in properties as the angle of incidence of light is changed. The first filter discussed (CASE 1) has no transmission loss or band-factor change at angles including 13 degrees.

If full waves are used as in CASE 2, a 10% transmission loss results at 13 degrees. For first and last cavities of: ZTZ 3T 3Z 2T ZTZTZ, 4% transmission loss results at 13 degrees. I investigated various structures and the best all around properties follow. For the type: ZTZ 3T 3Z 4T Z 3T ZTZ for outer cavities, and one half-wave added to either of the inner cavities at a position of the second layer away from the half-wave in any direction. A filter with 55 layers consisting of 79 quarter-waves results. Transmission is preserved at 13 degrees with 96% T, ripple R=97.5% min. and shape-factor S=2.72. This is illustrated in FIG. 7.

Filters with a ripple factor R=92% min. and a ratio of S=2.55 result for:

Z 3T 3Z 3T 3Z 2T 3Z 3T 3Z 3T Z for the first and last cavities.

This adds 32 quarter waves to the filter for a total of 87. Adding one more cavity instead would have more benefits.

Figure 9:
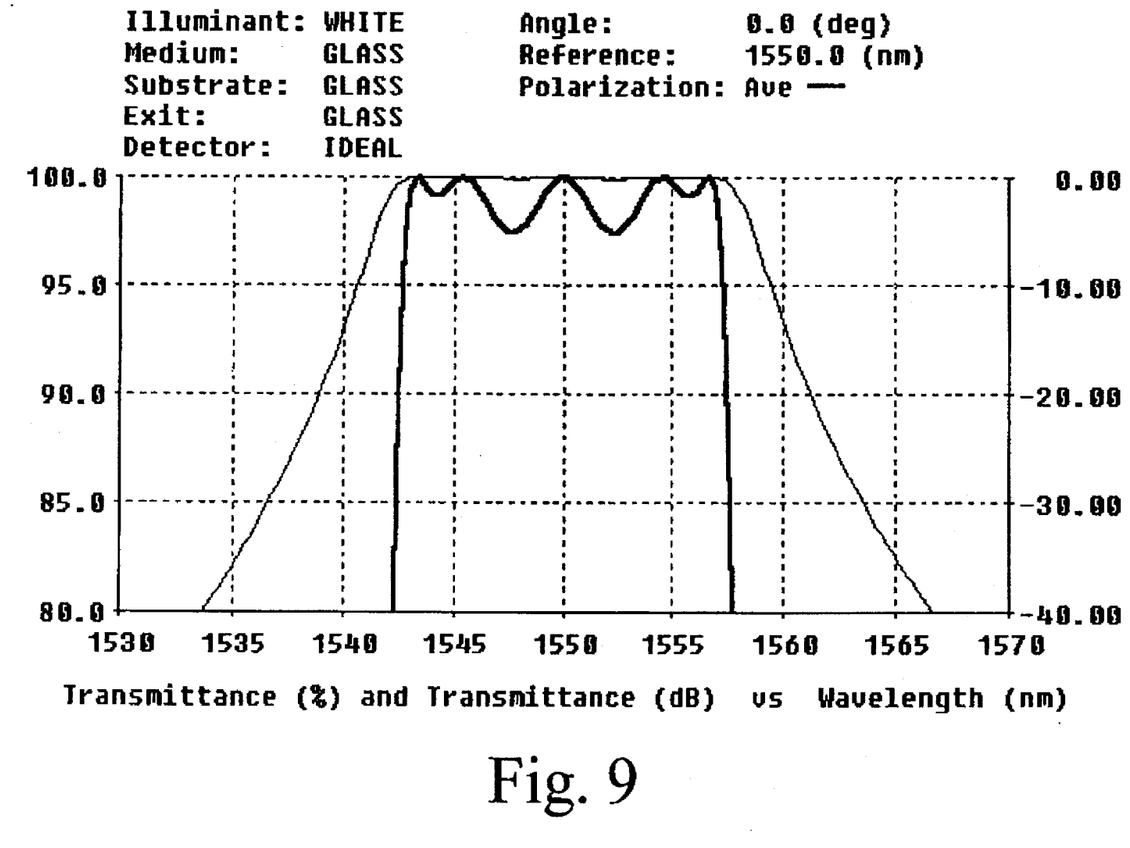
FIG. 9 is a chart representing a 73 layer four cavity filter with 90 quarter-waves designed in accordance with the invention.

A five cavity filter with the structure:

ZTZ 3T 3Z 4T 3Z 3T (ZT)6 (TZ)7 T 3Z 4T (ZT)8 (TZ)6 3T 3Z 4T 3Z 3T ZTZ has 73 layers and 90 quarter waves. Transmission at 13 degrees is 97%. Ripple R=97.5% and the shape-factor S=2.0. This is illustrated in FIG. 9.

To achieve better shapes for a five cavity filter, the structure:

TZT 3Z 3T 3Z 4T 3Z 3T Z 3T (ZT)5 (TZ)7 3T 3Z 2T Z 3T (ZT)7 (TZ)5 3T Z 3T 3Z 4T 3Z 3T 3Z TZT has 73 layers and 112 quarter waves. Transmission at 13 degrees is 91% minimum. Ripple R=96% and the shape-factor S=1.90. A six cavity filter with less quarter waves has better properties as follows.

A six cavity filter with the structure:

T (ZT)2 3Z 4T (ZT)7 (TZ)8 2T Z 3T (ZT)4 Z 3T 3Z T Z 2T (ZT)8 (TZ)7 4T 3Z (TZ)2 T has 89 layers and 107 quarter waves. Transmission at 13 degrees is 96%.

Figure 10:
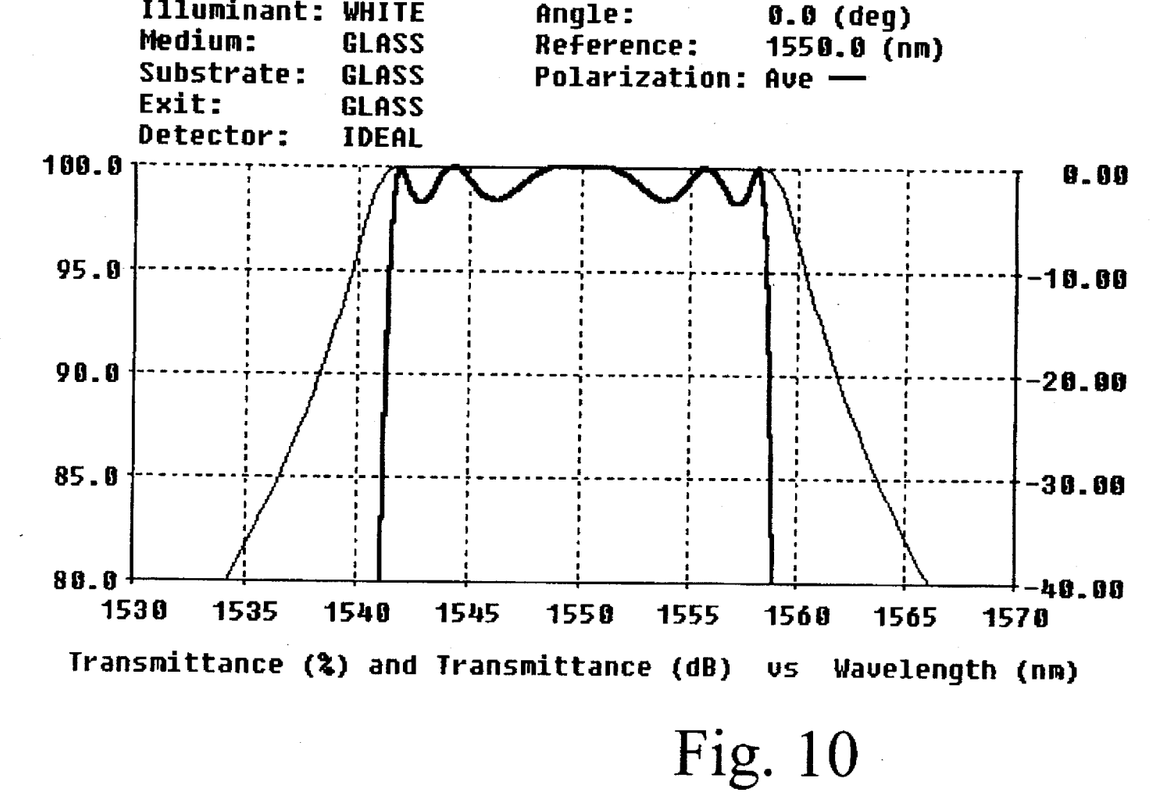
FIG. 10 is a chart representing a 89 layer four cavity filter with 107 quarter-waves designed in accordance with the invention; and, FIG. 11 is a graph of transmittance versus wavelength for a 51 layer bandpass filter with a fire cavity structure utilizing Tantalum Pentoxide and Silicon Dioxide for materials.

Ripple R=98.5% and Shape-factor S=1.73. Performance is illustrated in FIG. 10.

Figure 11:
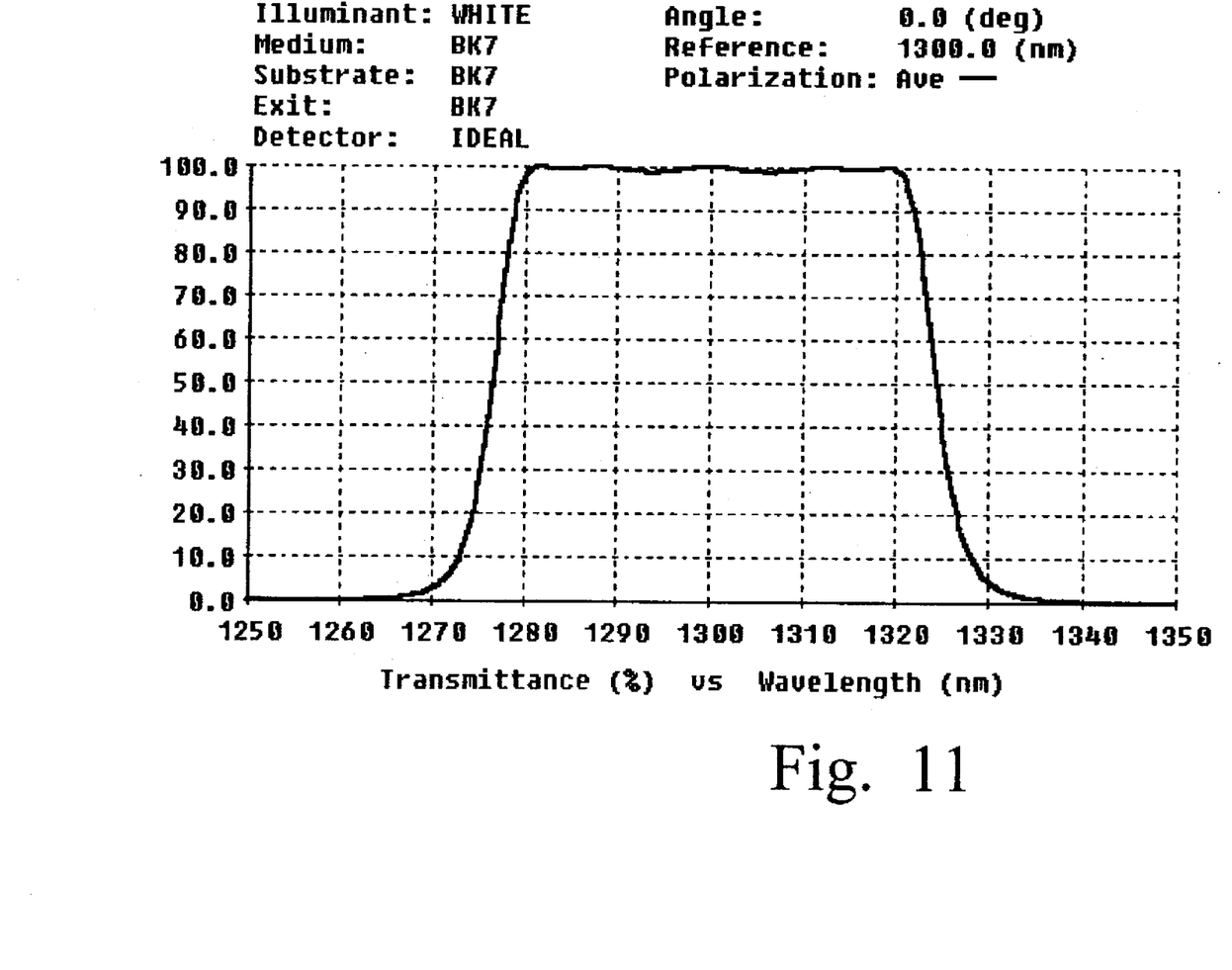

The spectral characteristics of a filter consisting of alternating layers of Tantalum Pentoxide and Silicon Dioxide is plotted in FIG. 11. The design is:

T 3Q 3T 4Q 3T Q (TQ)4 (QT)5 3Q T 4Q (TQ)6 (QT)4 Q 3T 4Q 3T 3Q T which contains 51 layers with 76 quarter-waves. The transmission is more than 98.5% minimum. Slope S=2.2. A graph of Transmittance vs. Wavelength is shown in FIG. 11.

This demonstrates that the basic band is practically independent of both the ratio of the indices of refraction and also the absolute values of each index of refraction. Comparisons of changing the high index with a constant low index show minor changes in the reflection value at the peak within the passband.

In summary, the filter in accordance with this invention provides substantial improvement in its output response over conventional filters. This is achieved by ensuring that the outer cavities have 4 less layers than the inner core cavities and that half-waves are added to the quarter-wave stacks (and possibly the outer cavity half-waves).

Of course numerous other embodiments and applications may be envisaged, without departing from the spirit and scope of the invention.

What I claim is:

1. A bandpass filter comprising: an array of cavities including two outer cavities and one or more inner core cavities, each cavity having a plurality of quarter-wave reflecting stacks some of the quarter-wave reflecting stacks including at least a three-quarter wave layer, the reflecting stacks comprising layers of material of alternating high and low refractive index, said plurality of stacks beings separated by a half wave layer of dielectric material, each cavity being separated by quarter-wave layer of low refractive index material, wherein the number of layers in the at least one or more inner core cavities is an odd number greater or equal to 7, and wherein the first and last cavities in said array of cavities each have two less layers in each quarter-wave reflecting stack than in other quarter-wave reflecting stacks of the one or more inner core cavities in said array, wherein the at least one three-quarter-wave layer in either of the outer cavities are for altering the slope of the passband, and wherein the at least one three-quarter-wave layer disposed in the one or more inner core cavities are for lessening ripple induced by any three-quarter-wave layers present in any of the outer cavities.

2. A bandpass filter comprising: an array of cavities including two outer cavities and at least one or more inner cavities, each cavity having a plurality of quarter-wave reflecting stacks comprising layers of material of alternating high and low refractive index, the plurality of quarter-wave reflecting stacks being separated by a half-wave layer of dielectric material, the plurality of quarter-wave reflecting stacks of said outer cavities being separated by a multiple half-wave layer of dielectric material for broadening the bandwidth of a passband of the filter and for reducing residual reflections, each cavity being separated by quarter-wave layer of low refractive index material, wherein the number of layers in the at least one or more inner cavities is an odd number greater or equal to 7, and wherein the two outer cavities in said array of cavities each have two less layers in each quarter-wave reflecting stack than in other quarter-wave reflecting stacks of the at least one or more inner cavities in said array, wherein at least one of the quarter-wave reflecting stacks of the outer cavities have selected layers in the outer cavities being a thickness of a three-quarter wave to increase the slope of the passband, and wherein selected layers of the quarter-wave stacks of the one or more inner cavities are a thickness of a three-quarter-wave to lessen ripple induced by a three-quarter-wave layer present in one or both of the two outer cavities.

3. A bandpass filter comprising: an array of cavities including two outer cavities and at least one or more inner cavities, each cavity having a plurality of quarter-wave reflecting stacks comprising layers of material of alternating high and low refractive index, the quarter-wave reflecting stacks being separated by a multiple half-wave layer of dielectric material, and the plurality of stacks of said two outer cavities being separated by a multiple half-wave layer of dielectric material for broadening the bandwidth of a passband of the filter and for reducing residual reflections, each cavity being separated by quarter-wave layer of low refractive index material, wherein the number of layers in the at least one or more inner cavities is an odd number greater or equal to 7, and wherein the two outer cavities in said array of cavities each have two less layers in each quarter-wave reflecting stack than in other quarter-wave reflecting stacks of the at least one or more other cavities in said array, wherein some of the quarter-wave reflecting stacks of the two outer cavities have selected layers being a thickness of three-quarter wave to alter the slope of the passband, and wherein selected layers of the quarter-wave stacks of the at least one or more inner cavities are a thickness of a three-quarter-wave to lessen ripple induced by a three-quarter-wave layer present in one or both of the outer cavities.

4. A bandpass filter as defined in claim 3, wherein the multiple half-wave layers of dielectric material of the at least one or more other cavities adjacent to the two outer cavities comprises fewer multiple half-waves than the multiple half-wave layer of the two outer cavities.

* * * * *